(12) United States Patent
Pechanec et al.

(10) Patent No.: US 9,262,232 B2
(45) Date of Patent: Feb. 16, 2016

(54) PRIORITY BUILD EXECUTION IN A CONTINUOUS INTEGRATION SYSTEM

(75) Inventors: Jiri Pechanec, Mokra-Horakov (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 445 days.

(21) Appl. No.: 13/407,868

(22) Filed: Feb. 29, 2012

(65) Prior Publication Data

US 2013/0227557 A1    Aug. 29, 2013

(51) Int. Cl.
| | |
|---|---|
| G06F 9/46 | (2006.01) |
| G06F 9/455 | (2006.01) |
| G06F 9/52 | (2006.01) |
| G06F 9/48 | (2006.01) |

(52) U.S. Cl.
CPC . *G06F 9/52* (2013.01); *G06F 9/485* (2013.01)

(58) Field of Classification Search
None
See application file for complete search history.

(56) References Cited

U.S. PATENT DOCUMENTS

| 8,424,007 | B1 * | 4/2013 | Hernacki et al. | 718/103 |
|---|---|---|---|---|
| 2003/0135536 | A1 * | 7/2003 | Lyons | 709/103 |
| 2005/0021693 | A1 * | 1/2005 | Tsuda et al. | 709/220 |
| 2009/0007100 | A1 * | 1/2009 | Field et al. | 718/1 |
| 2009/0031312 | A1 * | 1/2009 | Mausolf et al. | 718/102 |
| 2009/0217265 | A1 * | 8/2009 | Ishikawa | 718/1 |
| 2009/0249334 | A1 * | 10/2009 | Yamaguchi et al. | 718/1 |
| 2009/0300605 | A1 * | 12/2009 | Edwards et al. | 718/1 |
| 2010/0199351 | A1 * | 8/2010 | Protas | 726/25 |
| 2011/0107331 | A1 * | 5/2011 | Evans et al. | 718/1 |
| 2011/0202918 | A1 * | 8/2011 | Park et al. | 718/1 |
| 2013/0047154 | A1 * | 2/2013 | Mehta | 718/1 |
| 2013/0174117 | A1 * | 7/2013 | Watters et al. | 717/106 |
| 2013/0219385 | A1 * | 8/2013 | Geibel et al. | 718/1 |

\* cited by examiner

*Primary Examiner* — Tammy Lee
(74) *Attorney, Agent, or Firm* — Lowenstein Sandler LLP

(57) ABSTRACT

A mechanism for priority build execution in a continuous integration system is disclosed. A method includes executing, by a computing device in a continuous integration system, a low priority job of the continuous integrations system using a resource of the computing device. The method also includes receiving a high priority job to be executed by the computing device and identifying a conflict at the resource when the high priority job is assigned to execute using the same resource that is currently being used for executing the low priority job. When the conflict is identified, the method further includes suspending the execution of the low priority job, recording a state of the low priority job at a time of the suspension of the execution and executing the high priority job using the resource.

20 Claims, 5 Drawing Sheets

PRIORITY BUILD EXECUTION IN A CONTINUOUS INTEGRATION SYSTEM

TECHNICAL FIELD

The embodiments of the invention relate generally to a computer system and, more specifically, relate to mechanism for priority build execution in a continuous integration environment.

BACKGROUND

Continuous integration is a modern technology used in software engineering and software quality assurance. Continuous integration is a software development practice of frequently integrating new or changed code with an existing code repository, resulting in multiple integrations. There are various continuous integration systems that exist today. One such system is Jenkins. Jenkins provides a continuous integration system, making it easier for developers to integrate changes to a project and making it easier for users to obtain a fresh build.

However, Jenkins and other continuous integration systems face the problem of system congestion. System congestion occurs when there are several jobs waiting in a queue to be executed. One solution to system congestion is for the continuous integration system to prioritize incoming jobs to be executed, and then execute the high priority, infrequent jobs ahead of the low priority jobs. However, a problem with this prioritization solution is that the high priority jobs often have to wait until the currently-executed jobs are completed, which may take several hours, or even days. Thus, this prioritization solution frequently does not actually solve the above-mentioned system congestion problem in continuous integration systems.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

Figure 1:
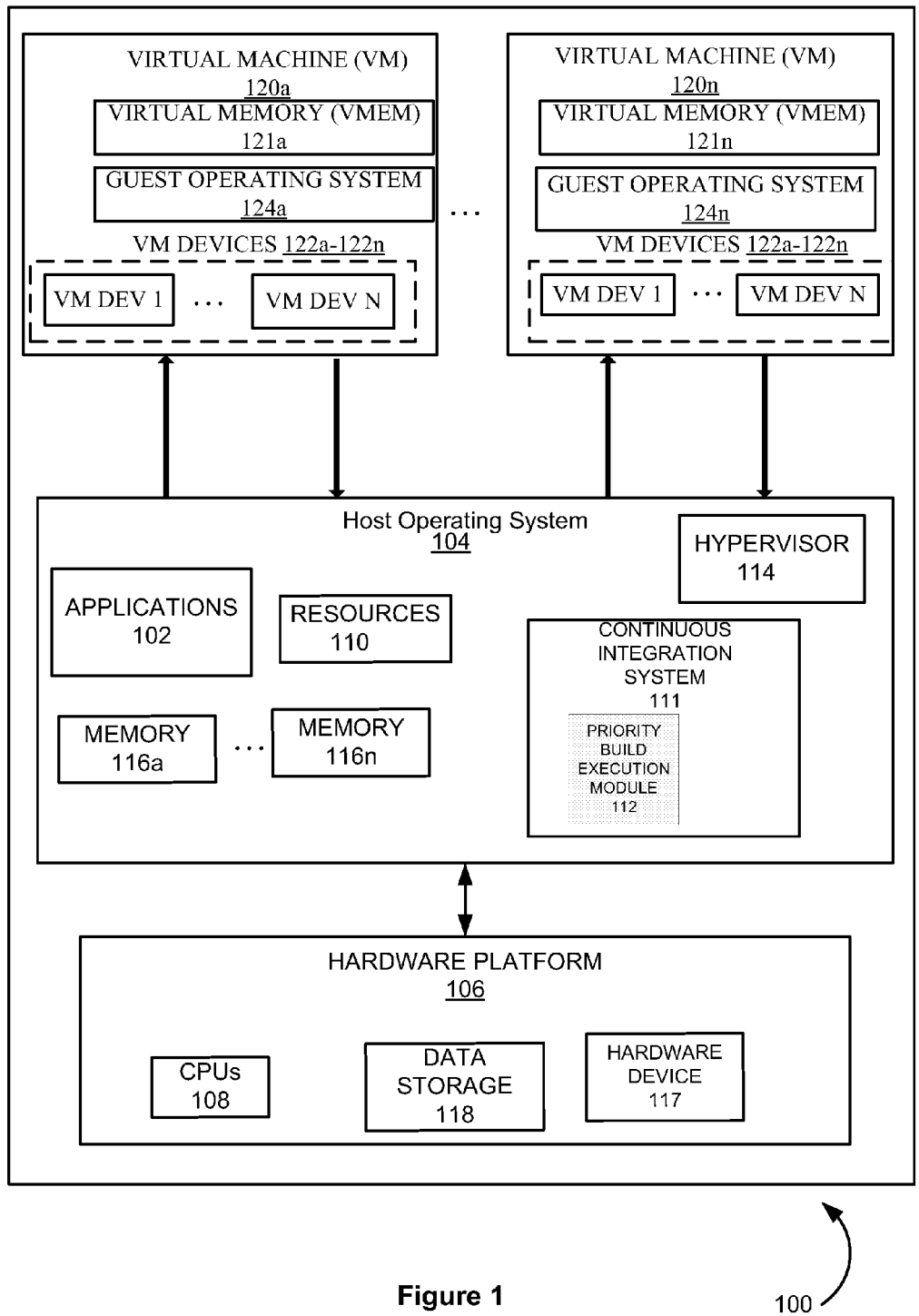
FIG. 1 is a block diagram of a computer system in which the embodiments of the present invention may operate.

Embodiments of the invention provide a mechanism for priority build execution in a continuous integration system.

According to one embodiment of the invention, the method includes executing, by a computing device in a continuous integration system, a low priority job of the continuous integration system using a resource of the computing device. The method also includes receiving a high priority job to be executed by the computing device and identifying a conflict at the resource when the high priority job is assigned to execute using the same resource that is currently being used for executing the low priority job. When the conflict is identified, the method further includes suspending the execution of the low priority job, recording a state of the low priority job at a time of the suspension of the execution and executing the high priority job using the resource.

According to another embodiment of the invention, the method includes managing, by a priority build execution component of a computing device in a continuous integration system, a low priority job in execution on a first virtual machine (VM) of the computing device and receiving, by the priority build execution module, a high priority job to be executed. The method also includes identifying a conflict such that the high priority job is assigned to be executed by the first VM and when the conflict is identified, suspending the execution of the low priority job on the first VM, and when the execution of the low priority job is suspended, recording a state of the first VM in a snapshot file stored in a hard drive of the computing device. The method further includes stopping execution of the first VM and, while the low priority job is suspended, managing, by the priority build execution component, execution of the high priority job on a second VM.

According to further embodiment of the invention, the method includes managing, by a priority build execution component of a computing device in a continuous integration system, a low priority job that is execution on a first virtual machine (VM) of the computing device and receiving, by the priority build execution component, a high priority job to be executed. The method also includes identifying a conflict such that the high priority job is assigned to be executed by the first VM and when the conflict is identified, suspending execution of the first VM and the low priority job. A state of the first VM and the low priority job at a time of the suspension is maintained in a virtual memory of the first VM. While the first VM and the low priority job are suspended, the method further includes managing, by the priority build execution component, execution of the high priority job on a second VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "stopping", "suspending", "forwarding", "executing", "determining", "identifying", "recording", "resuming" "managing", "computing", "generating" "detecting", "transferring", "retrieving", "storing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention disclose systems and methods for providing a priority build execution in a continuous integration system. Continuous integration is a software development practice of frequently integrating new and/or changed code with an existing code repository, resulting in multiple integrations. In one embodiment, a priority build execution module is initialized on a host operation system (OS) to provide a priority build execution optimization for a continuous integration system of the priority build execution module.

FIG. 1 is a block diagram illustrating a computer system 100 in which embodiments of the present invention may be implemented. In one embodiment, the computer system 100 may be a host machine such as, for example, a server computer, a gateway computer or any other suitable computer system that is configurable for operating as a host. The computer system 100 comprises a hardware platform 106, on top of which runs a host OS 104. The host OS 104 may include Microsoft Windows®, Unix®, Linux®, Solaris®, Mac® OS or any other suitable operating system for managing operations on the computer system 100.

The hardware platform 106 may include one or more central processing units (CPUs) 108 and data storage 118. In one embodiment, the data storage 118 comprises one or more hardware and software devices, which may be located internally and externally to the computer system 100. Examples of data storage 118 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 106 may include additional hardware devices 117, such as network interface cards (NICs), sound or video adaptors, photo/video cameras, printer devices, keyboards, displays or any other suitable device intended to be coupled to a computer system.

The host OS 104 may include one or more software application programs 102 (i.e. applications). In one embodiment, the applications 102 executed by host OS 104 comprise multiple JAVA applications. In some embodiments, the multiple JAVA applications may be separate individual JAVA applications or multiple versions of the same JAVA applications, or a combination of both. The host OS 104 also includes one or more resources 110. A resource 110 is an application-specific or process-specific software construct serving as a communications endpoint. In one embodiment, the resources 110 are application-specific and are utilized to execute the applications 102 executed by the host OS 104. In one embodiment, the one or more resources 110 are network ports, each of which are identified by a port number that is based on an application address of the computer system 100 and a communication protocol used over the port. The host OS 104 also includes one or more memories 116a-116n located internally to the computer system 100. Examples of data storage memories 116a-116n may include, but are not limited to, random-access memory (RAM), read-only memory (ROM), and cache memory.

In some embodiments, the host OS 104 includes a continuation integration system 111. As discussed above, the continuous integration system 111 frequently integrates new or changed code with an existing code repository, resulting in multiple integrations. In some embodiments, the continuous integration system 111 is interfaced by continuous integration application programming interfaces (APIs) to access and retrieve the application codes 102. In other embodiments, the continuous integration system 111 continuously integrates new or changed application codes with existing application codes 102.

In some embodiments, a priority build execution module 112 is integrated in the continuation integration system 111 of the host OS 104. In one embodiment, host OS 104 receives a high priority job to be executed while a low priority job is being executed using a resource 110 by the priority build execution module 112 of the continuous integration system 111. A job is a task or a process to be performed by the computing system 100. Jobs may be performed by a single or multiple programs, commands or script. In one embodiment, a low priority job is a process that utilizes a large amount of memory space and/or takes a large amount of time to complete. Similarly, a high priority job may be a process that utilizes a small amount of memory space and/or takes a short amount of time to complete.

In one embodiment, when the high priority job is received, the priority build execution module 112 determines a resource 110 that the high priority job is assigned to be used for execution, and whether there is conflict on the resource 110. A conflict occurs when the high priority job is assigned to be executed using the same resource 110 that is currently being used for executing the low priority job. As such, both the high priority and the low priority jobs are assigned to use the same resource 110 that cannot be shared at the same time. In one embodiment, if a conflict is detected, then the priority build execution module 112 suspends the low-priority job currently using the resource 110 for execution and records a state of the low priority job at the time of the suspension of the execution. In one embodiment, the state is condition or a status of the job that changes with time. Once the low priority job is suspended, the resource 110 is available to be used for another job and the priority build execution module 112 executes the high priority job using the resource 110. Upon completion of execution of the high priority job, the priority build execution module 112 resumes execution of the low priority job from its recorded state at the suspension using the resource 110.

In some embodiments, virtualization is utilized to provide the priority build execution feature for continuous integration. The host OS 104 may be configured with one or more virtual machines (VMs) 120a-120n. VMs 120a-120n are portions of software that, when executed on appropriate hardware, create an environment that virtualizes a physical computer system. Each of the VMs 120a-120n includes a virtual memory (VMEM) 121a-121n, which is a virtualization of memory 116a-116n of host OS 104. Each of VMs 120a-120n may function as a self-contained platform, comprising one or more virtual devices 122a-122n and running a corresponding guest OS 124a-124n. The guest OS 124a-124n in each of the VMs 120a-120n may be the same or different OSs. Similar to the host OS 104, the guest OS 124a-124n may be Microsoft Windows®, Unix®, Linux®, Solaris®, Macintosh® OS, or any other suitable operating system for managing operations associated with a virtualization environment.

In one embodiment, a hypervisor 114, which emulates the underlying hardware platform 106 for VMs 120a-120n, is provided and may run on host OS 104 of the computer system 100. A hypervisor may also be known as a virtual machine monitor (VMM), a kernel-based hypervisor or a host operating system. The hypervisor 114 may support multiple VMs 120a-120n executing on the host OS 104 of computer system 100. Alternatively, more than one hypervisor (not shown) may be provided to support multiple VMs 120a-120n executing on the host OS 104.

In one embodiment, assume that VM 120a is executing a low priority job using a VMEM 121a. Concurrently, host OS 104 receives a high priority job to be executed by the VM 120a. The priority build execution module 112 determines that there is conflict between jobs on VM 120a because the high priority job is assigned to be executed by VM 120a, which is already executing the low priority job. Once a conflict is determined between a high priority job and a low priority job, the priority build execution module 112 may implement one of two options.

In the first option, when the conflict is detected, the priority build execution module 112 suspends the execution of the low priority job on the VM 120a. Then, a state of the low priority job at the time of the suspension is recorded by taking a snapshot of the VM at the time of the suspension of the low priority job. In one embodiment, the snapshot is a file-based representation of the state of the VM 120a at the time of the suspension. In one embodiment, the snapshot of the state of VM 120a is stored in a hard drive of the computer system 100, such as in the data storage 118. After the snapshot of VM 120a has been taken and stored, execution of VM 120a is stopped on the computing device 100.

The priority build execution module 112 then executes the high priority job at another VM, such as VM 120b using the VMEM 121b. Upon completion of the execution of the high priority job at VM 120b, the priority build execution module 112 retrieves the previously-recorded VM snapshot file from the hard drive (i.e., data storage 118), and resumes the execution of the low priority job from the recorded state of the low priority job at the time of the suspension. The execution of the low priority job is resumed at VM 120a.

In the second option, when the conflict is detected between the high priority job and the low priority job, the priority build execution module 112 suspends the execution of the VM 120a itself, which consequently results in the suspension of the low priority job at the same time. The state of the VM 120a, which includes the state of the low priority job, is maintained in memory, such as VMEM 121a, of the VM 120a while the VM 120a is in the suspended state. While VM 120a (and the low priority job) is in a suspended state, the priority build execution module 112 executes the high priority job in another VM, such as VM 120b using the VMEM 121b. Upon completion of the execution of the high priority job, the priority build execution module 112 resumes the execution both the VM (e.g. VM 12a) and the low priority job from the recorded state in the VM 120a-120n originally executing the low priority job (e.g., VM 120a) using the VMEM 121a-121n of that VM 120a-120n (e.g., 121a).

Figure 2:
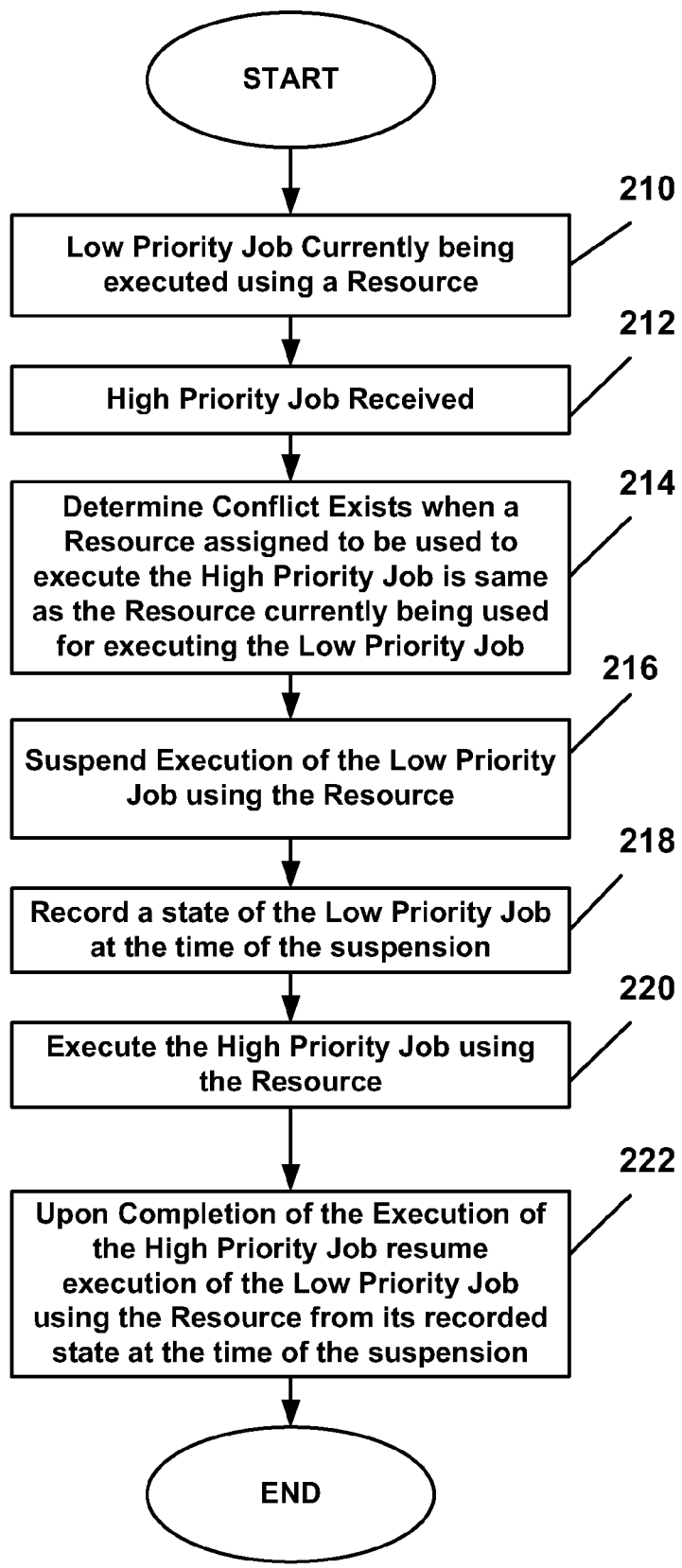
FIG. 2 is a flow diagram of one embodiment of a method for providing priority build execution in a continuous integration.

FIG. 2 is a flow diagram illustrating a method 200 for providing priority build execution for continuous integration according to an embodiment of the present invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by the priority build execution module 112 in the continuous integration 111 of FIG. 1.

Method 200 begins at block 210 where a low priority job is executed in a continuous integration system 111 using a resource 110 and one of the memories such as memory 116a. As discussed above, a resource is an application-specific or process-specific software construct serving as a communications endpoint. At block 212, a high priority job is received. At block 214, the priority build execution module 112 determines that a conflict exists when a resource assigned to be used to execute the high priority job is same as the resource 110 that is currently being used for executing the low priority job. At block 216, the priority build execution module 112 suspends the execution of the low priority job using the resource 110. At block 218, the priority build execution module 112 records a state of the low priority job at the time of the suspension. As discussed above, the state is condition or a status of the job that changes with time. Once the low priority job is suspended, the resource 110 is available to be used for another job. At block 220, the high priority job is executed using the resource 110 and the memories such as 116b and 116c of the memories 116. Upon completion of the high priority job at block 222, execution of the low priority job is resumed from its recorded state at the time of the suspension using the resource 110 and the memory 116a.

Figure 3:
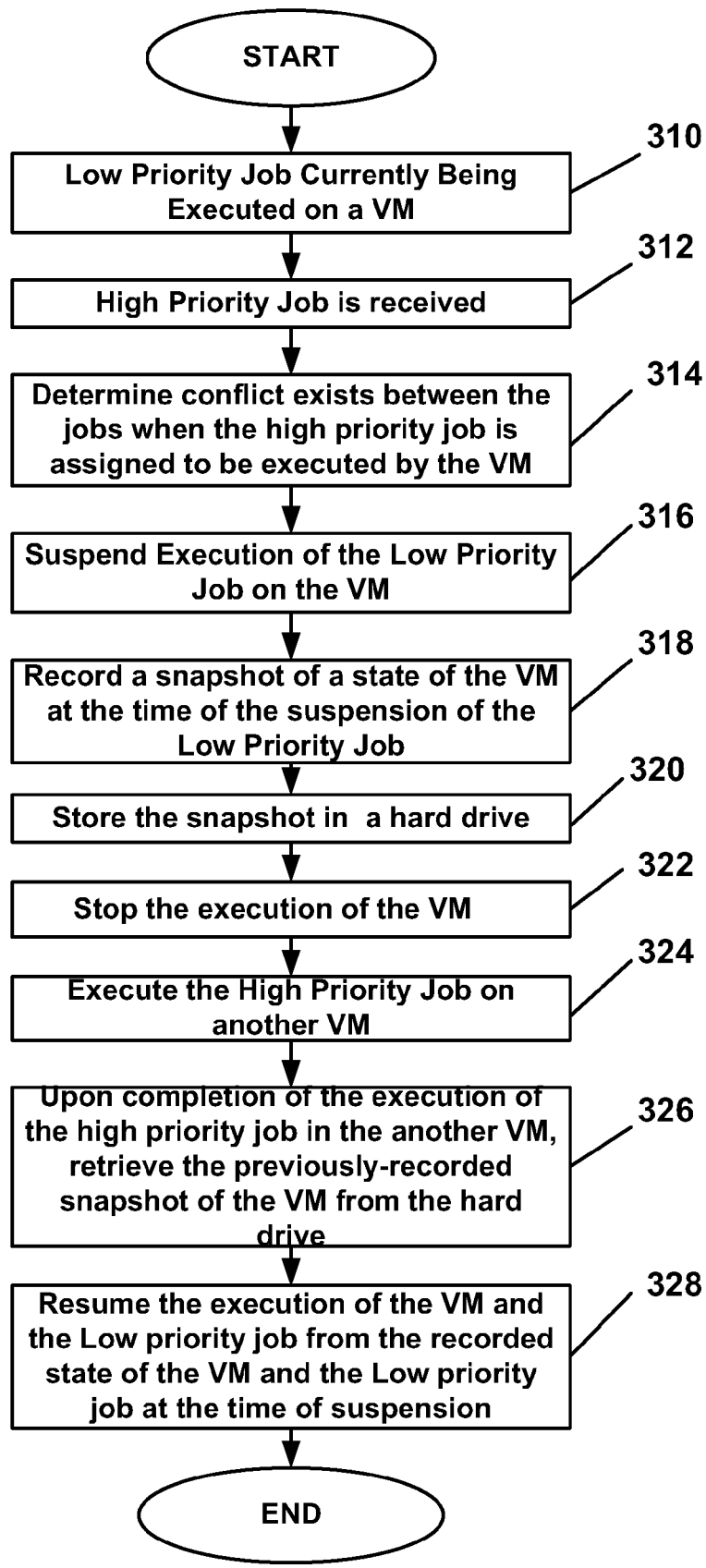
FIG. 3 is a flow diagram of another embodiment of a method for providing a priority build module in a continuous integration.

FIG. 3 is a flow diagram illustrating a method 300 for providing priority build execution for continuous integration according to an embodiment of the present invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the priority build execution module 112 in the continuous integration 111 of FIG. 1.

Method 300 begins at block 310 where a low priority job is executed on a VM such as VM 120a using a VMEM such as VMEM 121a associated with the VM 120a. As discussed above, the execution of the low priority job is managed in the continuous integration system 111. At block 312, a high priority job to be executed is received by a host OS 104. At block 314, priority build execution module 112 determines that a conflict exists between the jobs when the high priority job is assigned to be executed by the VM 120a which is already executing the low priority job. At block 316, the low priority job being executed on the VM 120a is suspended by the priority build execution module 112. Then, at block 318, a state of the VM 120a at the time of the suspension is recorded by the priority build execution module 112 by taking a snapshot of the VM at the time of the suspension of the low priority job. In one embodiment, the snapshot is a file-based representation of the state of the VM 120a at the time of the suspension. At block 320, the snapshot of the state of VM 120a is stored in a hard drive of the computer system 100, such as in the data storage 118. After the snapshot of VM 120a has been taken and stored, the priority build execution module 112 stops the execution of VM 120a on the computing device 100 at block 322. The priority build execution module 112 then at block 324 executes the high priority job at another VM such as VM 120b using another VMEM such as VMEM 121b associated with the VMEM 120b. Upon completion of the execution of the high priority job, at block 324, the priority build execution module 112 at block 326 retrieves the previously-recorded VM snapshot file from the hard drive (i.e. data storage 118). At block 328, the priority build execution module 112 resumes the execution of both the VM 120a and the low priority job from the recorded state of the VM 120a and the low priority job at the time of the suspension.

Figure 4:
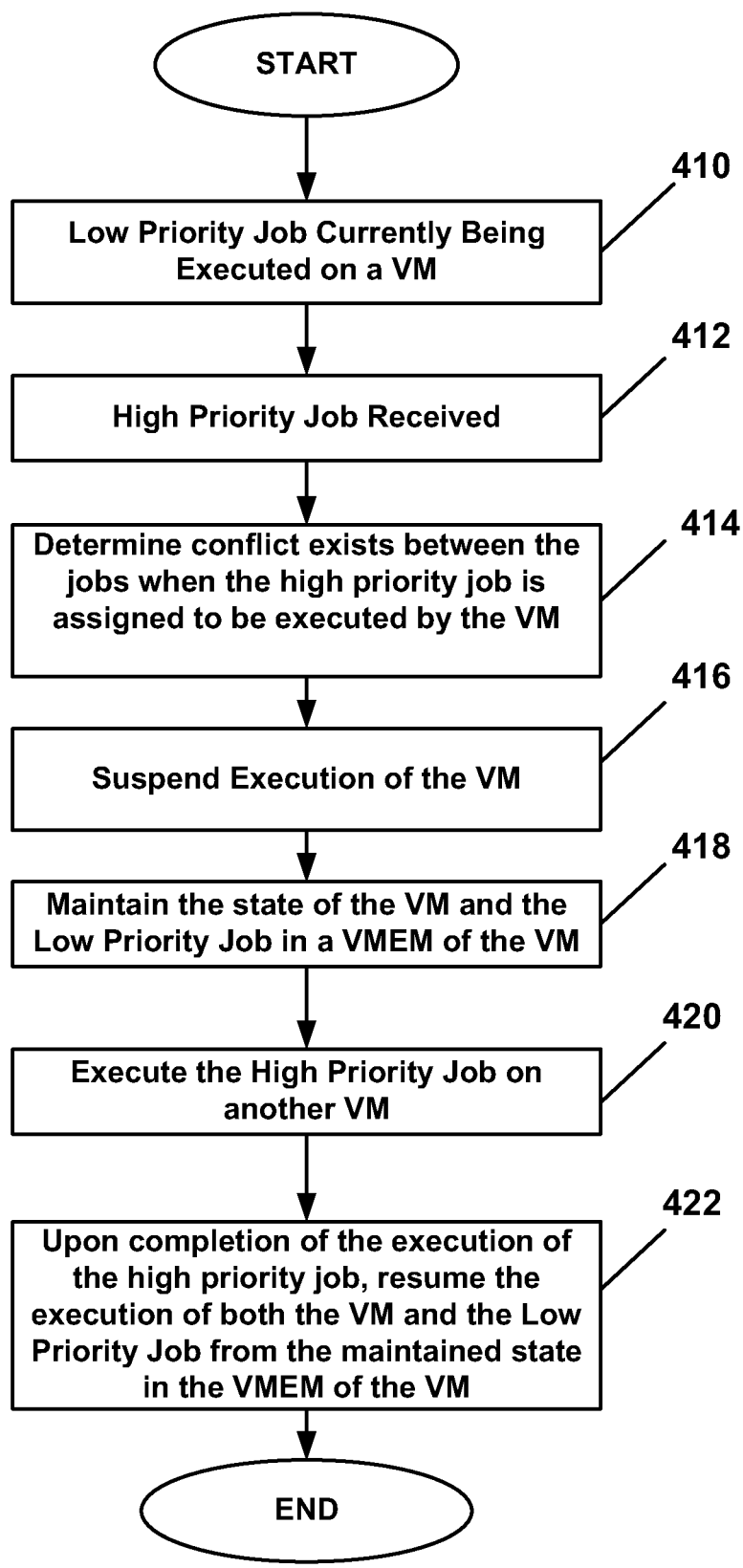
FIG. 4 is a flow diagram of further embodiment of a method for providing a priority build module in a continuous integration.

FIG. 4 is a flow diagram illustrating a method 400 for providing priority build execution for continuous integration according to an embodiment of the present invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the priority build execution module 112 in the continuous integration 111 of FIG. 1.

Method 400 begins at block 410 where a low priority job is executed on VM such as VM 120a using a VMEM such as VMEM 121a associated with the VM 120a. As discussed above, the execution of the low priority job is managed in the continuous integration system 111. At block 412, a high priority job is received by a host OS 104. At block 414, priority build execution module 112 determines that a conflict exists between the jobs when the high priority job is assigned to be executed by the VM 120a which is already executing the low priority job. At block 416, the priority build execution module 112 suspends the execution of the VM 120a, which consequently, results in the suspension of the low priority job at the same time. At block 418, the state of VM 120a which includes the state of the low priority job is maintained in the memory VMEM 121a. While VM 120a (and the low priority job) is in a suspended state, at block 420, the priority build execution module 112 executes the high priority job in another VM, such as VM 120b using another VMEM such as the VMEM 121b associated with the VM 120b. Upon completion of the execution of the high priority job at block 418, the priority build execution module 112 at block 422 resumes the execution of both the VM 120a and the low priority job from the state maintained in the VMEM 121a in the VM 120a.

Figure 5:
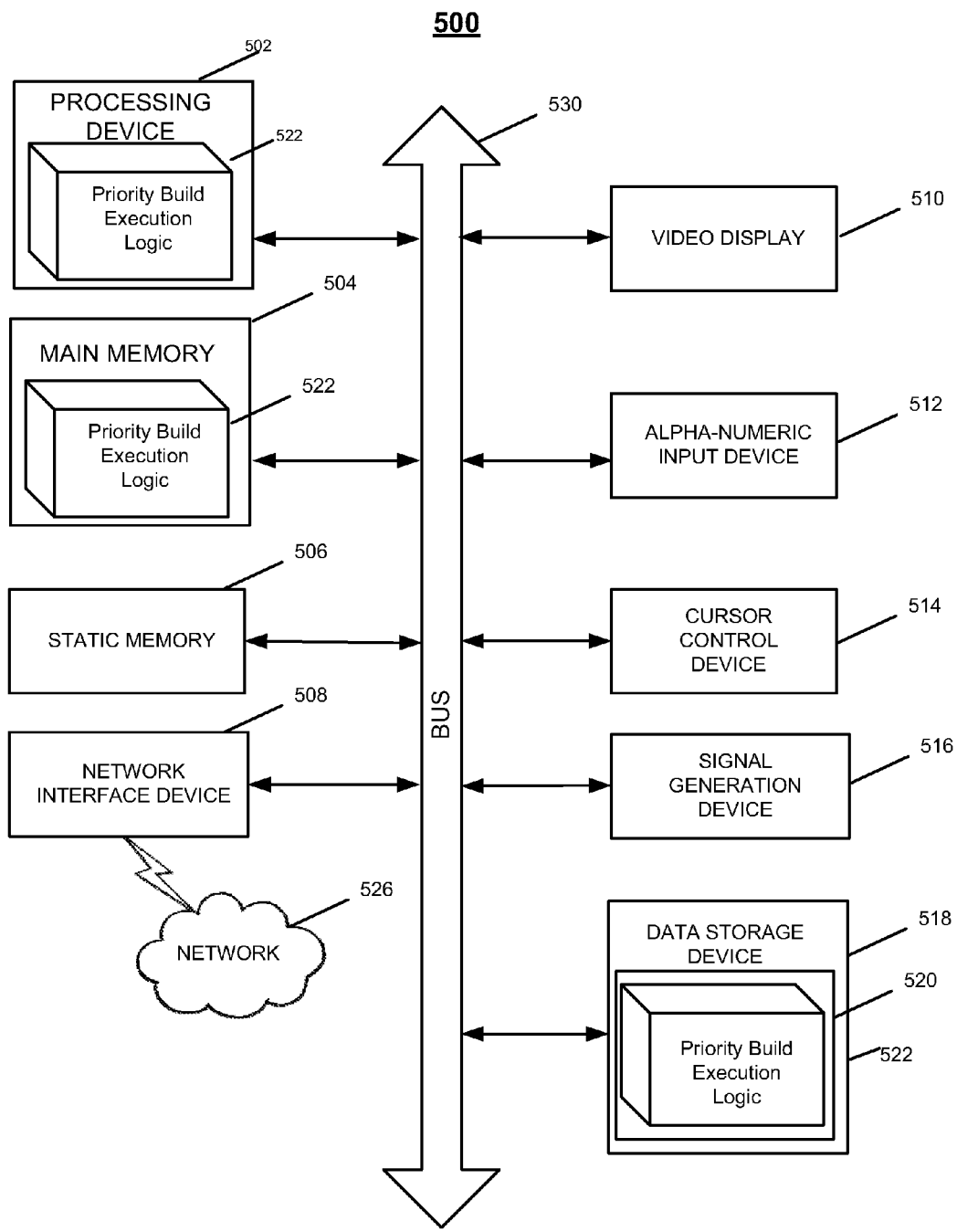
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute priority build execution logic 522 for performing the operations and steps discussed herein. In one embodiment, performance build execution module 112 described with respect to FIG. 1 performs the priority build execution logic 522.

The computer system 500 may further include a network interface device 408. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium (or more specifically a computer-readable storage medium) 520 on which is stored one or more sets of instructions (e.g. priority build execution logic 522) embodying any one or more of the methodologies of functions described herein, such as methods 200, 300 and 400 for providing priority build execution in a continuous integration system described with respect to FIGS. 2, 3 and 4 respectively. The priority build execution module logic 522 may also reside, completely or at least partially, within the memory 404 and/or within the processing device 502 during execution thereof by the computer system 500; the memory 504 and the processing device 502 also constituting machine-accessible storage media.

The machine-readable storage medium 520 may also be used to store the priority build execution module logic 522 persistently containing methods that call the above applications. While the machine-accessible storage medium 520 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A method, comprising:
    executing, by a processing device in a continuous integration system, a low priority job of the continuous integration system using a resource of the processing device, wherein the low priority job comprises a process utilizing one of a specific amount of memory space or a specific amount of time to complete;
    receiving, by the processing device in the continuous integration system, a high priority job to be executed, wherein the high priority job comprises a process utilizing at least one of a smaller amount of memory space than the specific amount of memory space utilized by the process of the low priority job or a shorter amount of time to complete than the specific amount of time to complete utilized by the process of the low priority job;
    identifying a conflict at the resource of the processing device in the continuous integration system, the conflict comprising the high priority job assigned to execute using the resource currently being used for executing the low priority job;
    when the conflict is identified, suspending the execution of the low priority job at the resource of the processing device in the continuous integration system;
    recording a state of the low priority job at the resource of the processing device in the continuous integration system, wherein the state is recorded at a time of the suspension of the execution;
    executing, by the processing device, the high priority job; and
    updating an application in the low priority job at the resource of the processing device in the continuous integration system.

2. The method of claim 1 further comprising:
    when the execution of the high priority job completes, resuming the execution of the low priority job from the recorded state using the resource.

3. The method of claim 1 wherein the recorded state comprises a status of the low priority job at the time of the suspension.

4. A method, comprising:
    managing, by a processing device in a continuous integration system, a low priority job in execution on a first virtual machine (VM) of the processing device, wherein the low priority job comprises a process utilizing one of a specific amount of memory space or a specific amount of time to complete;
    receiving, by the processing device in the continuous integration system, a high priority job to be executed, wherein the high priority job comprises a process utilizing at least one of a smaller amount of memory space than the specific amount of memory space utilized by the process of the low priority job or a shorter amount of time to complete than the specific amount of time to complete utilized by the process of the low priority job;
    identifying a conflict such that the high priority job is assigned to be executed by the first VM of the processing device in the continuous integration system;
    when the conflict is identified, suspending the execution of the low priority job on the first VM of the processing device in the continuous integration system;
    when the execution of the low priority job is suspended, recording a state of the first VM of the processing device in the continuous integration system, wherein the state is recorded in a snapshot file to be stored in a hard drive of the processing device;
    stopping execution of the first VM of the processing device in the continuous integration system;
    while the low priority job is suspended, managing, by the processing device, execution of the high priority job; and
    updating an application in the low priority job on a second VM of the processing device in the continuous integration system.

5. The method of claim 4 further comprising:
    retrieving the snapshot file from the hard drive upon completion of execution of the high priority job.

6. The method of claim 4 further comprising, when the execution of the high priority job completes,
    resuming execution of the first VM from the snapshot file; and
    resuming execution of the low priority job on the first VM.

7. A method, comprising:
    managing, by a processing device in a continuous integration system, a low priority job that is in execution on a first virtual machine (VM) of the processing device in the continuous integration system, wherein the low priority job comprises a process utilizing one of a specific amount of memory space or a specific amount of time to complete;
    receiving, by the processing device in the continuous integration system, a high priority job to be executed, wherein the high priority job comprises a process utilizing at least one of a smaller amount of memory space than the specific amount of memory space utilized by the process of the low priority job or a shorter amount of time to complete than the specific amount of time to complete utilized by the process of the low priority job;
    identifying a conflict such that the high priority job is assigned to be executed by the first VM of the processing device in the continuous integration system;

when the conflict is identified, suspending the execution of the first VM and the low priority job of the processing device in the continuous integration system, wherein a state of the first VM and the low priority job at a time of the suspension is maintained in a virtual memory of the first VM of the processing device in the continuous integration system;

while the first VM and the low priority job are suspended, managing, by the processing device, execution of the high priority job; and updating an application in the low priority job on a second VM of the processing device in the continuous integration system.

8. The method of claim 7 further comprising:

when the execution of the high priority job completes at the second VM, resuming execution of both the first VM and the low priority job from the state maintained in the virtual memory of the first VM.

9. A system comprising:

a memory; and a processing device operatively coupled to the memory, to:
execute, in a continuous integration system, a low priority job using a resource of the processing device, wherein the low priority job comprises a process utilizing one of a specific amount of memory space or a specific amount of time to complete;

receive, in the continuous integration system, a high priority job to be executed, wherein the high priority job comprises a process utilizing at least one of a smaller amount of memory space than the specific amount of memory space utilized by the process of the low priority job or a shorter amount of time to complete than the specific amount of time to complete utilized by the process of the low priority job;

identify a conflict at the resource in the continuous integrations system such that the high priority job is assigned to execute using the resource currently being used for executing the low priority job;

when the conflict is identified, suspend the execution of the low priority job in the continuous integration system;

record a state of the low priority job at the resource in the continuous integration system, wherein the state is recorded at a time of the suspension of the execution;

execute the high priority job; and update an application in the low priority job using the resource in the continuous integration system.

10. The system of claim 9 wherein the processing device to:

when the execution of the high priority job completes, resume the execution of the low priority job from the recorded state using the resource.

11. A system comprising:

a memory; and a processing device operatively coupled to the memory, to:
manage, in a continuous integration system, a low priority job in execution on a first virtual machine (VM) of the processing device, wherein the low priority job comprises a process utilizing one of a specific amount of memory space or a specific amount of time to complete;

receive, in the continuous integration system, a high priority job to be executed, wherein the high priority job comprises a process utilizing at least one of a smaller amount of memory space than the specific amount of memory space utilized by the process of the low priority job or a shorter amount of time to complete than the specific amount of time to complete utilized by the process of the low priority job;

identify a conflict such that the high priority job is assigned to be executed by the first VM in the continuous integration system;

when the conflict is identified, suspend the execution of the low priority job on the first VM in the continuous integration system;

when the execution of the low priority job is suspended, record a state of the first VM in the continuous integration system, wherein the state is recorded in a snapshot file to be stored in a hard drive;

stop execution of the first VM in the continuous integration system;

while the low priority job is suspended, manage execution of the high priority job; and update an application in the low priority job on a second VM of the processing device in the continuous integration system.

12. The system of claim 11 wherein the processing device to:

retrieve the snapshot file from the hard drive upon completion of execution of the high priority job;

when the execution of the high priority job completes, resume execution of the first VM from the snapshot file; and resume execution of the low priority job on the first VM.

13. A system comprising:

a memory; and a processing device operatively coupled to the memory, to:
manage, in a continuous integration system, a low priority job that is in execution on a first virtual machine (VM) of the processing device, wherein the low priority job comprises a process utilizing one of a specific amount of memory space or a specific amount of time to complete;

receive, in the continuous integration system, a high priority job to be executed, wherein the high priority job comprises a process utilizing at least one of a smaller amount of memory space than the specific amount of memory space utilized by the process of the low priority job or a shorter amount of time to complete than the specific amount of time to complete utilized by the process of the low priority job;

identify a conflict such that the high priority job is assigned to be executed by the first VM in the continuous integration system;

when the conflict is identified, suspend execution of the first VM and the low priority job in the continuous integration system, wherein a state of the first VM and the low priority job at a time of the suspension is maintained in a virtual memory of the first VM in the continuous integration system; while the first VM and the low priority job are suspended, manage execution of the high priority job; and update an application in the low priority job on a second VM in the continuous integration system.

14. The system of claim 13 wherein the processing device to:

when the execution of the high priority job completes at the second VM, resume execution of both the first VM and the low priority job from the state maintained in the virtual memory of the first VM.

15. A non-transitory machine-readable storage medium including data that, when accessed by a processing device, cause the processing device to:

execute, by the processing device in a continuous integration system, a low priority job of the continuous integration system using a resource of the processing device, wherein the low priority job comprises a process utilizing one of a specific amount of memory space or a specific amount of time to complete;

receive, by the processing device in the continuous integration system, a high priority job to be executed, wherein the high priority job comprises a process utilizing at least one of a smaller amount of memory space than the specific amount of memory space utilized by the process of the low priority job or a shorter amount of time to complete than the specific amount of time to complete utilized by the process of the low priority job;

identify a conflict at the resource of the processing device in the continuous integration system, the conflict comprising the high priority job assigned to execute using the resource currently being used for executing the low priority job;

when the conflict is identified, suspend the execution of the low priority job at the resource of the processing device in the continuous integration system;

record a state of the low priority job at the resource of the processing device in the continuous integration system, wherein the state is recorded at a time of the suspension of the execution;

execute the high priority job; and update an application in the low priority job at the resource of the processing device in the continuous integration system.

16. The non-transitory machine-readable storage medium of claim 15, the processing device to:
when the execution of the high priority job completes, resume the execution of the low priority job from the recorded state using the resource.

17. A non-transitory machine-readable storage medium including data that, when accessed by a processing device, cause the processing device to:
manage, by the processing device in a continuous integration system, a low priority job in execution on a first virtual machine (VM) of the processing device, wherein the low priority job comprises a process utilizing one of a specific amount of memory space or a specific amount of time to complete;

receive, by the processing device in the continuous integration system, a high priority job to be executed, wherein the high priority job comprises a process utilizing at least one of a smaller amount of memory space than the specific amount of memory space utilized by the process of the low priority job or a shorter amount of time to complete than the specific amount of time to complete utilized by the process of the low priority job;

identify a conflict such that the high priority job is assigned to be executed by the first VM of the processing device in the continuous integration system;

when the conflict is identified, suspend the execution of the low priority job on the first VM of the processing device in the continuous integration system;

when the execution of the low priority job is suspended, record a state of the first VM of the processing device in the continuous integration system, wherein the state is recorded in a snapshot file to be stored in a hard drive of the processing device;

stop execution of the first VM of the processing device in the continuous integration system;

while the low priority job is suspended, manage, by the processing device, execution of the high priority job; and update an application in the low priority job on a second VM of the processing device in the continuous integration system.

18. The non-transitory machine-readable storage medium of claim 17, the processing device to:
retrieve the snapshot file from the hard drive upon completion of execution of the high priority job;
when the execution of the high priority job completes, resume execution of the first VM from the snapshot file; and
resume execution of the low priority job on the first VM.

19. A non-transitory machine-readable storage medium including data that, when accessed by a processing device, cause the processing device to:
manage by the processing device in a continuous integration system, a low priority job that is in execution on a first virtual machine (VM) of the processing device in the continuous integration system, wherein the low priority job comprises a process utilizing one of a specific amount of memory space or a specific amount of time to complete;

receive, by the processing device in the continuous integration system, a high priority job to be executed, wherein the high priority job comprises a process utilizing at least one of a smaller amount of memory space than the specific amount of memory space utilized by the process of the low priority job or a shorter amount of time to complete than the specific amount of time to complete utilized by the process of the low priority job;

identify a conflict such that the high priority job is assigned to be executed by the first VM of the processing device in the continuous integration system;

when the conflict is identified, suspend the execution of the first VM and the low priority job of the processing device in the continuous integration system, wherein a state of the first VM and the low priority job at a time of the suspension is maintained in a virtual memory of the first VM of the processing device in the continuous integration system;

while the first VM and the low priority job are suspended, manage execution of the high priority job; and update an application in the low priority job on a second VM of the processing device in the continuous integration system.

20. The non-transitory machine-readable storage medium of claim 19, the processing device to:
when the execution of the high priority job completes at the second VM, resume execution of both the first VM and the low priority job from the state maintained in the virtual memory of the first VM.

* * * * *